(12) United States Patent
Freissle et al.

(10) Patent No.: US 7,621,406 B2
(45) Date of Patent: Nov. 24, 2009

(54) CONVERSION KIT FOR PARTICULATE SCREENING SYSTEM AND RELATED IMPLEMENTATION METHODS

(75) Inventors: Manfred F. A. Freissle, Gauteng (ZA); Peter H. F. Freissle, Spartanburg, SC (US)

(73) Assignee: Polydeck Screen Corporation, Spartanburg, SC (US)

( * ) Notice: Subject to any disclaimer, the term of this patent is extended or adjusted under 35 U.S.C. 154(b) by 384 days.

(21) Appl. No.: 11/292,599

(22) Filed: Dec. 2, 2005

(65) Prior Publication Data

US 2006/0180510 A1   Aug. 17, 2006

Related U.S. Application Data

(60) Continuation-in-part of application No. 10/911,897, filed on Aug. 5, 2004, now Pat. No. 7,240,801, which is a division of application No. 10/212,670, filed on Aug. 5, 2002, now Pat. No. 6,957,741.

(60) Provisional application No. 60/310,651, filed on Aug. 7, 2001.

(51) Int. Cl.
*B07B 1/49* (2006.01)
(52) U.S. Cl. .................. 209/405; 209/399; 209/403; 209/408; 209/409
(58) Field of Classification Search ................ 209/392, 209/395, 397, 399–401, 403, 405, 408, 409
See application file for complete search history.

(56) References Cited

U.S. PATENT DOCUMENTS

| | | | |
|---|---|---|---|
| 1,939,314 A | 12/1933 | Neifert et al. | |
| 1,957,770 A | 5/1934 | Freeze | |
| 2,183,157 A | 12/1939 | Swedman | |
| 2,255,939 A | 9/1941 | Overstrom et al. | |
| 2,321,675 A | 6/1943 | Hauge | |
| 2,335,084 A | 11/1943 | Rice | |

(Continued)

FOREIGN PATENT DOCUMENTS

CA   2181321   7/1996

(Continued)

OTHER PUBLICATIONS

Abstract of S. African Patent No. 74/0027 (1974).

(Continued)

*Primary Examiner*—Patrick H MacKey
*Assistant Examiner*—Terrell H Matthews
(74) *Attorney, Agent, or Firm*—Dority & Manning, P.A.

(57) ABSTRACT

A conversion kit for interconnecting particulate screening panels to a support frame includes a plurality of panels, an interface and a connecting pin. A method of using the conversion kit includes the steps of providing at least two of the screening panels each defining at least one locating recess; providing an interface having at least one skirt depending therefrom and a bore therethrough; providing at least one pin defining a head and an opposing extension; attaching the head in the locating recesses to connect the screening panels together; inserting the skirt in an aperture of a support frame; and inserting the opposing extension in the bore of the skirt to attach the screening panels to the support frame for screening particulates.

9 Claims, 8 Drawing Sheets

U.S. PATENT DOCUMENTS

| | | | |
|---|---|---|---|
| 2,391,501 A | 12/1945 | O'Brien | |
| 2,487,914 A | 11/1949 | Woolcott et al. | |
| 2,576,794 A | 11/1951 | Jost et al. | |
| 3,074,134 A | 1/1963 | Bruechler | |
| 3,363,381 A | 1/1968 | Forrest | |
| 3,390,771 A | 7/1968 | Wehner | |
| 3,456,795 A | 7/1969 | Svensson et al. | |
| 3,456,796 A | 7/1969 | Eck et al. | |
| 3,565,251 A | 2/1971 | Pennington | |
| 3,795,311 A | 3/1974 | Martin | |
| 3,865,720 A | 2/1975 | Wilson | |
| 3,882,652 A | 5/1975 | Marchello | |
| 3,900,628 A | 8/1975 | Stewart | |
| 3,905,897 A | 9/1975 | Jacobson | |
| 3,980,555 A | 9/1976 | Freissle | |
| 4,062,769 A | 12/1977 | Simonson | |
| 4,120,785 A | 10/1978 | Kanamori et al. | |
| 4,141,821 A * | 2/1979 | Wolff | 209/405 |
| 4,219,161 A | 8/1980 | Freissle | |
| 4,222,865 A | 9/1980 | Valeri et al. | |
| 4,265,742 A | 5/1981 | Bücker et al. | |
| 4,278,535 A | 7/1981 | Wolff | |
| 4,347,129 A | 8/1982 | Rutherford | |
| 4,383,919 A | 5/1983 | Schmidt | |
| 4,391,559 A | 7/1983 | Mizusawa | |
| 4,405,272 A | 9/1983 | Wollar | |
| 4,409,099 A | 10/1983 | Wolff | |
| 4,563,270 A | 1/1986 | Wolff | |
| 4,661,245 A | 4/1987 | Rutherford et al. | |
| 4,670,136 A | 6/1987 | Schmidt et al. | |
| 4,716,694 A | 1/1988 | Freissle | |
| 4,757,664 A * | 7/1988 | Freissle | 52/509 |
| 4,762,610 A | 8/1988 | Freissle | |
| D302,019 S | 7/1989 | Dehlén | |
| 4,857,176 A | 8/1989 | Derrick et al. | |
| 4,871,288 A * | 10/1989 | Schmidt et al. | 411/45 |
| 4,882,044 A | 11/1989 | Freissle | |
| 4,885,040 A | 12/1989 | Wolff | |
| 4,892,767 A | 1/1990 | Freissle | |
| 4,909,929 A | 3/1990 | Tabor | |
| 4,932,112 A | 6/1990 | Tikkanen | |
| 5,045,184 A | 9/1991 | Arkles | |
| 5,049,262 A | 9/1991 | Galton et al. | |
| 5,085,545 A * | 2/1992 | Takahashi | 411/45 |
| 5,112,475 A | 5/1992 | Henry, Jr. | |
| 5,213,217 A | 5/1993 | Galton et al. | |
| 5,248,043 A | 9/1993 | Dorn | |
| 5,255,790 A | 10/1993 | Einoder et al. | |
| 5,267,246 A | 11/1993 | Huang et al. | |
| 5,277,319 A | 1/1994 | Henry, Jr. | |
| 5,361,911 A | 11/1994 | Waites, Sr. et al. | |
| 5,363,970 A | 11/1994 | Freissle | |
| 5,372,261 A | 12/1994 | Galton et al. | |
| 5,385,242 A | 1/1995 | Freissle | |
| 5,462,175 A | 10/1995 | Bokor | |
| 5,464,101 A | 11/1995 | Freissle | |
| 5,664,685 A | 9/1997 | Freissle | |
| 5,699,918 A | 12/1997 | Dunn | |
| 5,755,334 A | 5/1998 | Wojcik et al. | |
| 5,769,240 A | 6/1998 | Middour et al. | |
| 5,769,241 A | 6/1998 | Woodgate | |
| 5,816,412 A | 10/1998 | Bokor | |
| 5,816,413 A | 10/1998 | Boccabella et al. | |
| 5,829,599 A | 11/1998 | Woodgate | |
| 5,938,042 A | 8/1999 | Freissle et al. | |
| 6,070,737 A | 6/2000 | Russell et al. | |
| 6,089,805 A * | 7/2000 | Salmon | 411/45 |
| 6,206,200 B1 | 3/2001 | Gilles et al. | |
| D445,437 S | 7/2001 | Sawall et al. | |
| 6,253,926 B1 | 7/2001 | Woodgate | |
| 6,260,711 B1 | 7/2001 | Woodgate | |
| 6,267,246 B1 | 7/2001 | Russell et al. | |
| 6,634,505 B1 | 10/2003 | Sawall et al. | |
| RE38,303 E | 11/2003 | Askew | |
| 7,273,151 B2 * | 9/2007 | Sawall et al. | 209/405 |
| 7,296,685 B2 | 11/2007 | Malmberg | |
| 2003/0012833 A1 | 1/2003 | Freissle et al. | |
| 2004/0074820 A1 | 4/2004 | Sawall et al. | |

FOREIGN PATENT DOCUMENTS

| | | |
|---|---|---|
| DE | 1155963 | 10/1963 |
| DE | 3123405 | 4/1982 |
| DE | 3606854 | 9/1987 |
| DE | 3724246 | 2/1989 |
| DE | 4140210 | 6/1993 |
| DE | 1 9707092 | 8/1998 |
| EP | 0167999 | 1/1986 |
| EP | 202863 | 11/1986 |
| FR | 2574007 | 6/1986 |
| GB | 2092917 | 8/1982 |
| WO | 8905202 | 6/1989 |
| WO | 9005594 | 5/1990 |
| WO | WO 0053343 A1 | 9/2000 |
| WO | WO 0064599 | 11/2000 |
| WO | WO 0073669 A1 | 12/2000 |
| WO | WO 03047771 | 6/2003 |
| ZA | 735815 | 8/1973 |
| ZA | 740027 | 1/1975 |
| ZA | 7 45121 | 1/1976 |
| ZA | 745131 | 1/1976 |
| ZA | 745092 | 5/1976 |
| ZA | 7 71322 | 5/1978 |
| ZA | 771362 | 5/1978 |
| ZA | 7 75426 | 2/1979 |
| ZA | 775496 | 2/1979 |
| ZA | 8 18723 | 11/1982 |
| ZA | 8 18724 | 11/1982 |
| ZA | 8 18725 | 11/1982 |
| ZA | 818783 | 11/1982 |
| ZA | 818784 | 11/1982 |
| ZA | 818785 | 11/1982 |
| ZA | 8 25021 | 4/1983 |
| ZA | 825061 | 4/1983 |
| ZA | 8 55126 | 7/1985 |
| ZA | 855136 | 7/1985 |
| ZA | 852624 | 10/1985 |
| ZA | 8 63726 | 1/1987 |
| ZA | 863796 | 1/1987 |
| ZA | 866976 | 4/1987 |
| ZA | 867986 | 5/1987 |
| ZA | 870436 | 6/1987 |
| ZA | 877168 | 4/1988 |
| ZA | 883971 | 5/1988 |
| ZA | 894955 | 4/1990 |
| ZA | 896821 | 10/1990 |
| ZA | 902563 | 1/1991 |
| ZA | 917021 | 5/1992 |
| ZA | 920994 | 10/1992 |
| ZA | 929933 | 6/1993 |
| ZA | 938247 | 6/1994 |
| ZA | 940452 | 9/1994 |
| ZA | 946891 | 4/1995 |
| ZA | 950711 | 8/1995 |
| ZA | 978673 | 3/1999 |
| ZA | 010631 | 6/2001 |
| ZA | 0301469 | 11/2003 |

OTHER PUBLICATIONS

Abstract of S. African Patent No. 74/5131 (1975).
Abstract of S. African Patent No. 77/1362 (1978).
Abstract of S. African Patent No. 77/5496 (1979).
Abstract of S. African Patent No. 81/8783 (1982).
Abstract of S. African Patent No. 81/8784 (1982).

Abstract of S. African Patent No. 81/8785 (1982).
Abstract of S. African Patent No. 82/5061 (1983).
Abstract of S. African Patent No. 85/2624 (1985).
Abstract of S. African Patent No. 86/3796 (1986).
Abstract of S. African Patent No. 86/6976 (1987).
Abstract of S. African Patent No. 86/7986 (1987).
S. African Registered Design No. 87/0436 (1987).
Abstract of S. African Patent No. 87/7168 (1988).
Abstract of S. African Patent No. 88/3971 (1988).
Abstract of S. African Patent No. 89/4955 (1990).
Abstract of S. African Patent No. 89/6821 (1990).
Abstract of S. African Patent No. 90/2563 (1990).
Abstract of S. African Patent No. 91/7021 (1992).
S. African Registered Design No. 92/0994 (1992).
Abstract of S. African Patent No. 92/9933 (1993).
Abstract of S. African Patent No. 93/8247 (1994).
Abstract of S. African Patent No. 94/0452 (1994).
Abstract of S. African Patent No. 94/6891 (1995).
Abstract of S. African Patent No. 95/0711 (1995).
Abstract of S. African Patent No. 97/8673 (1997).
Abstract of German Patent No. 31/23405 (1982).
Abstract of French Patent No. 25/74007 (1986).
Abstract of German Patent No. 36/06854 (1987).
Abstract of German Patent No. 37/24246 (1989).
Abstract of German Patent No. 41/40210 (1993).
Photographs regarding Poly-NORR-TAB™ Screen Cloth by Norris Screen & Manufacturing, Inc.- 1985.
Brochure regarding Poly-NORR-TAB™ Screen Cloth by Norris Screen & Manufacturing, Inc.- 1985.
English Translation of EP 0167999 A2 (1986).
Letter dated Nov. 2, 2004 regarding photographs and brochure of the Poly-NORR-TAB™ by Norris Screen & Manufacturing, Inc.- 1985.

* cited by examiner

CONVERSION KIT FOR PARTICULATE SCREENING SYSTEM AND RELATED IMPLEMENTATION METHODS

RELATED APPLICATIONS

The present application is a continuation-in-part application of and claims priority to U.S. patent application Ser. No. 10/911,897, which was filed Aug. 5, 2004, now U.S. Pat. No. 7,240,801 which is a divisional application of U.S. patent application Ser. No. 10/212,670, which was filed Aug. 5, 2002, now U.S. Pat. No. 6,957,741, which claims benefit of U.S. Provisional Patent Application Ser. No. 60/310,651, which was filed Aug. 7, 2001.

BACKGROUND OF THE INVENTION

Screening arrangements are known for screening particulate materials such as mineral ore as described in U.S. Pat. No. 4,892,767 (the '767 patent). According to the '767 patent, screening panels are attached to a support frame using projections extending from the screening panel. More specifically, the projections are inserted in corresponding holes in the support frame to attach the screening panel to the support frame. A number of apertures are formed in the screening panels to screen the ore.

The typical support frame is made intentionally large and heavy, usually of metal such as steel to withstand rigorous screening use. Accordingly, the typical support frame is not modified or replaced easily.

A system is needed in the screening industry, which permits the user to adapt new and different screening panels to conventional support frames without undue cost and effort.

BRIEF SUMMARY OF INVENTION

The present invention provides a screening arrangement, which includes a conversion kit that permits a technician to adapt various screening panels to existing support frames. The invention is also directed to various methods of attaching the screening panels to the support frames. The component parts of the invention are simple, reliable, and economical to manufacture, assemble, and use. Other advantages of the invention will be apparent from the following description and the attached drawings, or can be learned through practice of the invention.

According to one aspect of the invention, a screening element-securing device is provided for securing a screening element to a screen support frame. The securing device can be a durable, synthetic plastics material, such as polyurethane. The securing device can include a body portion having a connecting formation for connection to a complementary formation on a screen support member of a screen support frame to render the screening element securing device releasably connected to the screen support member; and a locating formation, provided on the body portion, for engagement with a complementary formation on a screening element to locate the screening element on the screen support frame.

The body portion can include an insert for insertion in an opening in the screen support member, the connecting formation being provided on the insert and being for connection to a complementary formation in the opening.

The locating formation can be provided on the insert and can include a locating protrusion for location in a locating recess of a screening element. The locating protrusion can include a shank, which extends axially away from the body portion, and a head formed at the free end of the shank.

In one version of this aspect of the invention, the securing device can include a securing formation, separate from the locating formation, which is receivable in a complementary securing formation on the screening element. The separate securing formation can further include a separate securing protrusion. The separate securing protrusion can include an annular ridge, which stands proud axially of the insert and around the locating protrusion.

The connecting formation in this aspect of the invention can include a screw thread for connection to a complementary connecting formation including a complementary screw thread. In one embodiment of this version, the insert can be monolithic and substantially cylindrical, the screw thread being provided on its outer surface, and the insert, shank, head and the annular ridge being unitary.

In another embodiment of this version of the invention, the insert can include a peripheral flange and a skirt fast with the flange, the connecting formation connectable with a complementary connecting formation on a screen support member being a peripheral radially outwardly facing groove defined in the body portion between the flange and the skirt, the body portion being resiliently deformable, the annular ridge standing proud axially of the peripheral flange, the insert defining an axial bore for receiving a pin which pin includes the shank and the head.

In another version of this aspect of the invention, the insert can define a locating formation in the form of a secondary opening for engaging the complementary formation on the screening element for locating and securing the screening element to the screen support member, the connecting formation on the insert comprising an external radially outwardly facing peripheral groove for connection with a complementary connecting formation in the form of an opening in a screen support member. In one embodiment of this version, the insert can include a peripheral flange and a skirt fast with the flange, the external peripheral groove being defined in the insert between the flange and the skirt, the skirt and the flange defining the secondary opening.

In another embodiment of this version, the insert can define a locating formation in the form of a secondary opening for engaging the complementary formation on the screening element for locating and securing the screening element to the screen support member, the connecting formation on the insert being in the form of an external screw thread connectable with a complementary screw thread in an opening in the screen support member. In this embodiment, the insert can have a peripheral flange and a skirt fast with the flange, the screw thread being provided on the outer surface of the skirt, and the skirt and the flange together defining the secondary opening.

According to another aspect of the invention, a screening element is provided, which has a peripheral frame defining an opening across which a plurality of mutually spaced ribs extend to define a screening surface. The peripheral frame in this aspect has an upper surface on the same side of the screening element as the screening surface, a lower surface on its side opposite its upper surface and an outer peripheral surface interconnecting the upper and lower surfaces, the peripheral frame being provided on its lower surface with locating formations for engagement with complementary locating formations on a screen support frame to locate the screening element on the screen support frame, and the peripheral frame being provided on its lower surface with separate securing formations for engagement with complementary separate securing formations on the screen support frame to secure the screening element against displacement on the screen support frame.

The locating formations can include locating recesses provided in the lower surface of the peripheral frame, respectively for receiving locating means in the form of locating protrusions on the screen support frame, for locating adjacent screening elements in position on the screen support frame.

The separate securing formations can include securing recesses provided in the lower surface of the peripheral frame, respectively for receiving securing means in the form of securing protrusions on the screen support frame, for securing the screening element against displacement on the screen support frame.

The screening element can be in the form of a screening panel, the peripheral frame comprising a pair of mutually laterally spaced side members, which are integral with a pair of mutually longitudinally spaced end members, with the side members and end members defining corners of the panel and peripheral frame where they meet.

The side members and end members of the frame can be rectangular in cross-section, thus defining a substantially flat upper surface, a substantially flat lower surface and a substantially flat outer peripheral surface for the peripheral frame. The locating recesses can be provided at or near the corners of the panel. The locating recesses can intersect the outer peripheral surface of the peripheral frame, and can be shaped such that when similar locating recesses on adjacent panels are brought into register, they and the similar locating recesses together define a locating socket into which a locating protrusion on the screen support frame is receivable to locate adjacent panels in position on the support frame.

The separate securing recesses can be formed in the panels near the locating recesses. The securing recesses can be endless grooves formed in the lower peripheral surface of the panel, each extending partly around one of the locating recesses, there being a securing recess for each locating recess. The grooves can be semi-circular in shape such that, when respectively brought into register with similar semi-circular grooves on adjacent panels, they and the similar grooves together define annular grooves around their associated locating recesses, for receiving complementary annular securing protrusions on the support frame, to secure the screening element against displacement on the support frame in use.

The screening panel can be of resiliently deformable material selected from the group consisting of plastics materials and elastomeric materials, such that the protrusions fit with interference, or clip, into their associated recesses. The plastics and elastomeric materials can be a synthetic polymeric material such as polyurethane or synthetic rubber.

According to a further aspect of the invention, a screen support frame sub-assembly includes an elongate screen support member of a screen support frame, the screen support member having connecting formations; and a plurality of securing devices releasably connected to the connecting formations of the screen support member; each securing device including a body portion having a connecting formation for connection to the connecting formations on the screen support member to render the screening element securing device releasably connected to the screen support member; and a locating formation, provided on the body portion, for engagement with a complementary formation on a screening element to locate the screening element on the screen support frame.

According to yet a further aspect of the invention, a screen support frame includes a plurality of screen support frame sub-assemblies spaced from and parallel to one another and spaced apart from one other by a plurality of spacer bars, each sub-assembly including an elongate screen support member having connecting formations; and a plurality of securing devices releasably connected to the connecting formations of the screen support member; such securing device including a body portion having a connecting formation for connection to the connecting formation on the screen support member to render the screening element securing device releasably connected to the screen support frame; and a locating formation, provided on the body portion, for engagement with a complementary formation on a screening element to locate the screening element on the screen support frame.

According to a still further aspect of the invention, a screening arrangement includes a screen support frame and a plurality of screening elements secured thereon, each screening element having a peripheral frame defining an opening across which a plurality of mutually spaced ribs extend to define a screening surface, the peripheral frame having an upper surface on the same side of the screening element as the screening surface, a lower surface on its side opposite its upper surface and an outer peripheral surface interconnecting the upper and lower surfaces, the peripheral frame being provided on its lower surface with locating formations for engagement with complementary locating formations on a screen support frame to locate the screening element on the screen support frame, the screen support frame including a plurality of screen support frame sub-assemblies spaced from and parallel to one another and spaced apart from one other by a plurality of spacer bars, each sub-assembly including an elongate screen support member having connecting formations; and a plurality of securing devices releasably connected to the connecting formations of the screen support member; each securing device including a body portion having a connecting formation for connection to the connecting formation on the screen support member to render the screening element securing device releasably connected to the screen support member; and a locating formation, provided on the body portion, for engagement with a complementary formation on the screening element to locate the screening element on the screen support frame. The peripheral frame of the screening element can be provided on its lower surface with separate securing formations for engagement with complementary separate securing formations on the screen support frame to secure the screening element against displacement on the screen support frame.

Additional features and advantages of the invention will become apparent to those skilled in the art upon consideration of the attached drawings in conjunction with the following detailed description of the drawings, which exemplifies the best mode of carrying out the invention as presently perceived, or can be learned through practice of the invention.

BRIEF DESCRIPTION OF THE DRAWINGS

The above and other aspects and advantages of the present invention are apparent from the detailed description below and in combination with the drawings in which.

DETAILED DESCRIPTION OF THE DRAWINGS

Detailed reference will now be made to the drawings in which examples embodying the present invention are shown. The detailed description uses numerical and letter designations to refer to features in the drawings. Like or similar designations in the drawings and description have been used to refer to like or similar parts of the invention.

The drawings and detailed description provide a full and detailed written description of the invention, and of the manner and process of making and using it, so as to enable one skilled in the pertinent art to make and use it, as well as the best mode of carrying out the invention. However, the examples set forth in the drawings and detailed description are provided by way of explanation of the invention and are not meant as limitations of the invention. The present invention thus includes any modifications and variations of the following examples as come within the scope of the appended claims and their equivalents.

Figure 1:
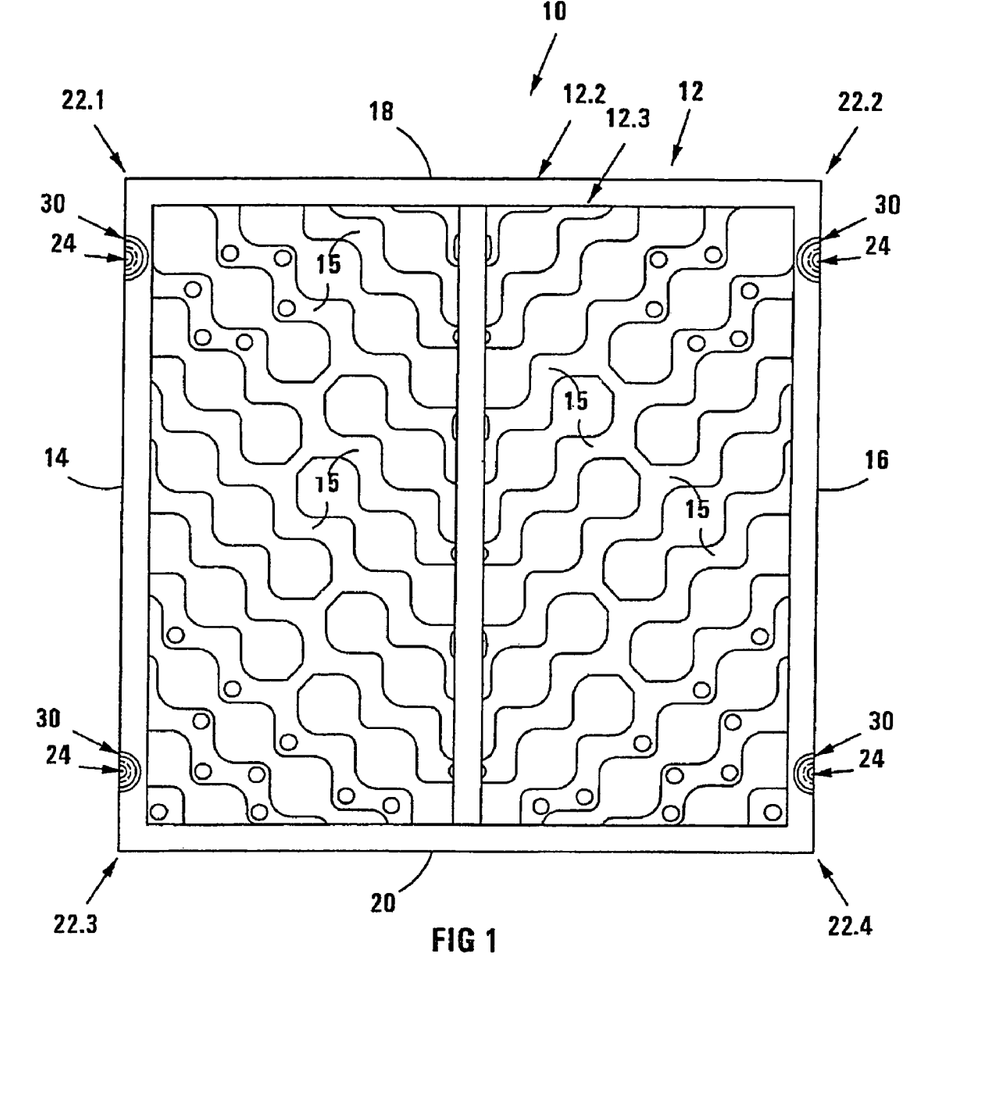
FIG. 1 is an underplan view of a screening panel according to one aspect of the invention.

In FIG. 1 of the drawings, reference numeral 10 generally indicates a screening panel in accordance with one aspect of the invention. The screening panel includes a peripheral frame 12 consisting of a pair of mutually laterally spaced side members 14, 16, which are integral with a pair of mutually axially spaced end members 18, 20. The side members 14, 16 and end members 18, 20 define corners of the panel 22.1, 22.2, 22.3 and 22.4 and the peripheral frame 12 where they meet. A plurality of mutually spaced ribs 15 extends across the periphery of the panel 10 to define a screening surface (not shown). As shown in FIG. 1, the ribs 15 may have a zig-zag configuration. The side members and end members are rectangular in cross-section, thereby defining substantially flat upper peripheral surfaces 12.1 (FIGS. 6, 7 and 8), outer peripheral surface 12.2 and lower peripheral surface 12.3 of the peripheral frame 12 and thus also the panel 10. The panel 10 includes locating recesses 24 provided at or near to the corners 22.1, 22.2, 22.3 and 22.4 of the panel 10. The locating recesses 24 are formed in the lower peripheral surface 12.3 and intersect the outer peripheral surface 12.2 of the panel 10 as can more clearly be seen in FIGS. 6, 7, 8 and 9 of the drawings. As may also more clearly be seen from FIGS. 6, 7, 8 and 9 of the drawings, when similar locating recesses 24 on adjacent panels 10 are brought into register with one another, they together define a locating socket 26 into which a protrusion or spigot 28, 29, 31, 33 which is complementarily shaped, can be received to locate adjacent panels 10 in position on a support frame 80 (see FIG. 13).

The panel 10 also has separate securing recesses in the form of semi-circular grooves 30 formed in the lower surface 12.3 of the panel 10, around the locating recess 24 and concentrically therewith. As can be seen from FIGS. 8 and 9, when brought into register with a similar semi-circular groove 30 on an adjacent panel 10, the grooves 30 together define an annular groove to receive a complementary securing formation in the form of an annular ridge 32 on a screen support frame sub-assembly 36.

Figure 10:
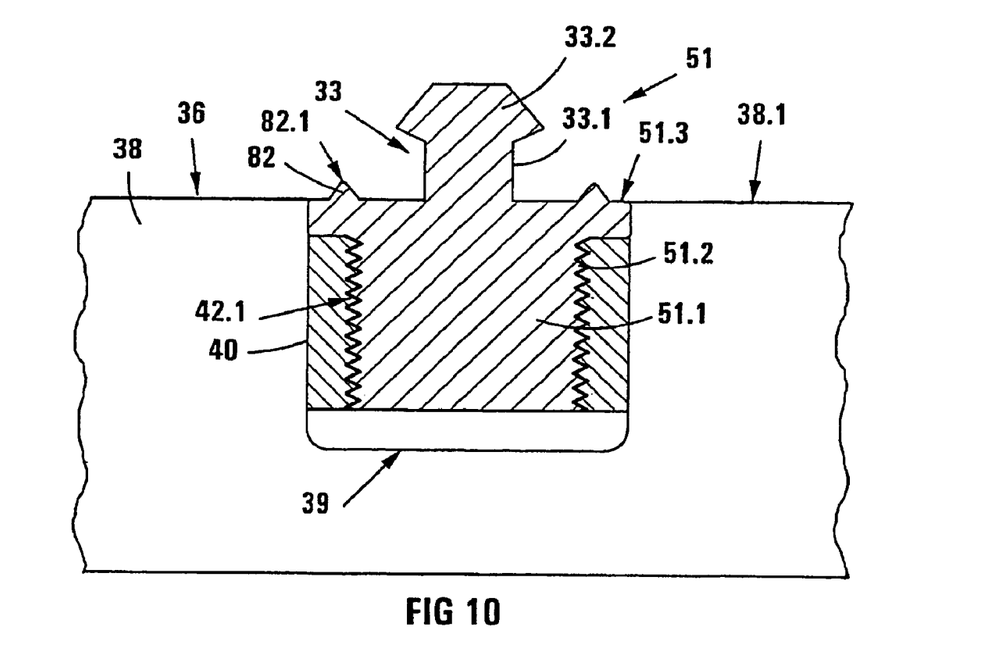
FIG. 10 shows a fragmentary partly cross-sectional side view of an elongate screen support member of a screen support frame sub-assembly having tubular members affixed thereto and securing devices according to another embodiment of the invention connected to the tubular members.

The invention extends to a screen support frame sub-assembly generally indicated by reference numeral 3 6. In the embodiment shown in FIGS. 2, 4, 6, 7, 8 and 10, the elongate screen support member of the sub-assembly 36 is an elongate bar 38 which has a rectangular cross-sectional profile of oblong shape, and cut-outs 39 into which tubular elements 40 can fit and are affixed to the bar by welding such that the longitudinal axis of the tubular element 40 extends in the direction of the longitudinal axis of the oblong cross-sectional profile of the bar 40. Each tubular element 40 defines an opening in the screen support member 38 which opening is a primary socket 42 into which a securing device, generally indicated by reference numeral 44 in FIGS. 2 and 3, 46 in FIGS. 4 and 5, 48 in FIG. 6, 49 in FIGS. 7 and 8, and 51 in FIG. 10, is releasably connectable as will be explained below.

It is to be understood that the versions of the securing devices and sub-assemblies of the invention shown in FIGS. 2, 3, 4 and 5 are intended for use with a screening panel 11 which is a known screening panel, and not a screening panel 10 in accordance with the invention.

The securing devices 44, 46 shown in FIGS. 2 to 5, are configured to engage locating formations in the form of protrusions 13 on screening panels 11, to locate and secure the screening panels 11 to a screen support frame sub-assembly 36, in the manner described below.

Figure 13:
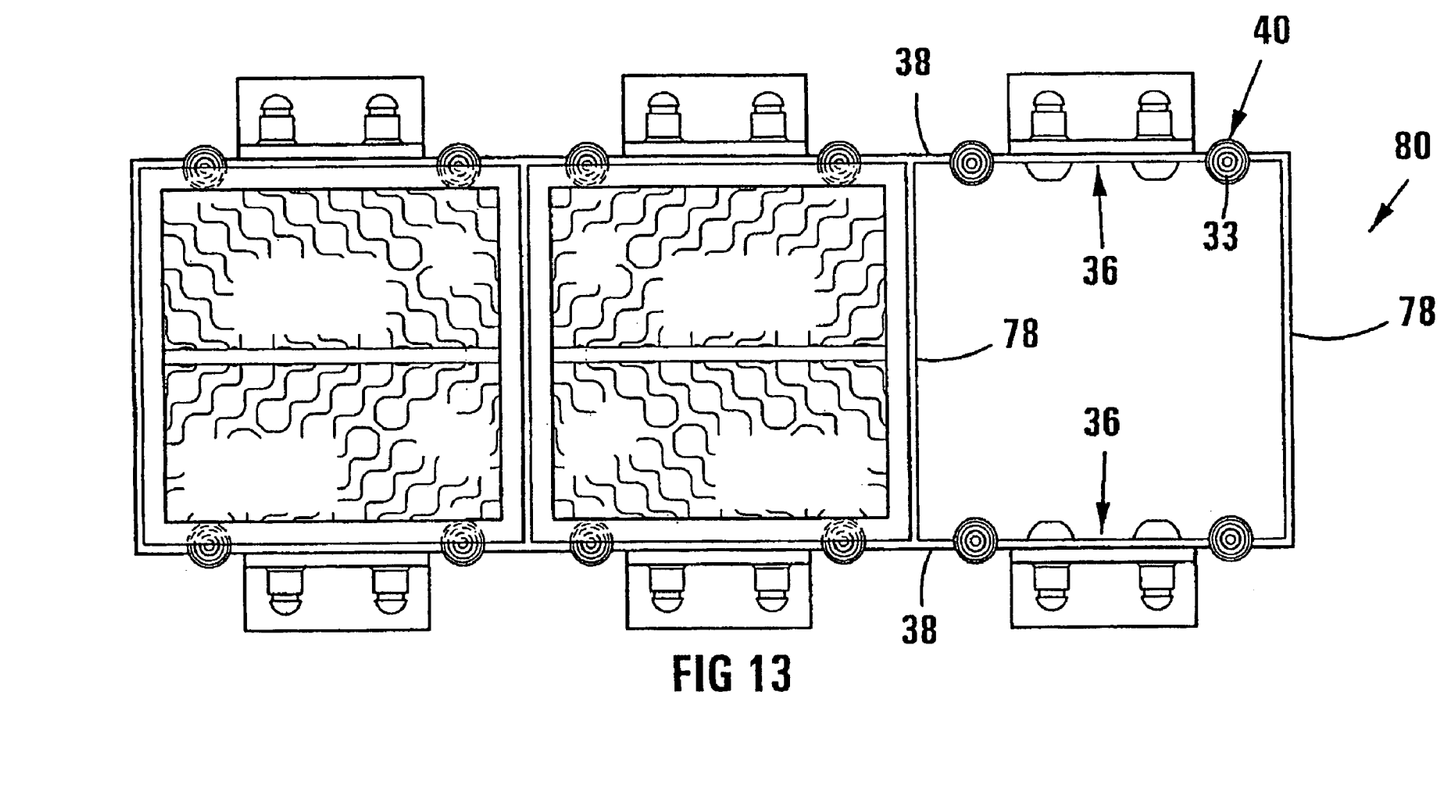
FIG. 13 shows a fragmentary top plan view of a screen support frame and screening arrangement in accordance with another aspect of the invention.

With reference to FIGS. 2, 4 and 6 to 8, a plurality of tubular elements 40 are affixed to the elongate bar 38, the tubular elements 40 being spaced from each other by distances complementary to the spacing between locating recesses 24 and grooves 30 in panels 10 according to the invention, or protrusions 13 in known panels 11, by means of which the screening panels 10, 11 are located and/or secured to the elongate bar 38 and thereby to a support frame of similar kind to the support frame 80 (FIG. 13). The width of the elongate bar 38 is smaller than the cross-sectional dimension of the primary socket 42.

Figures 2, 3, 4, 5:
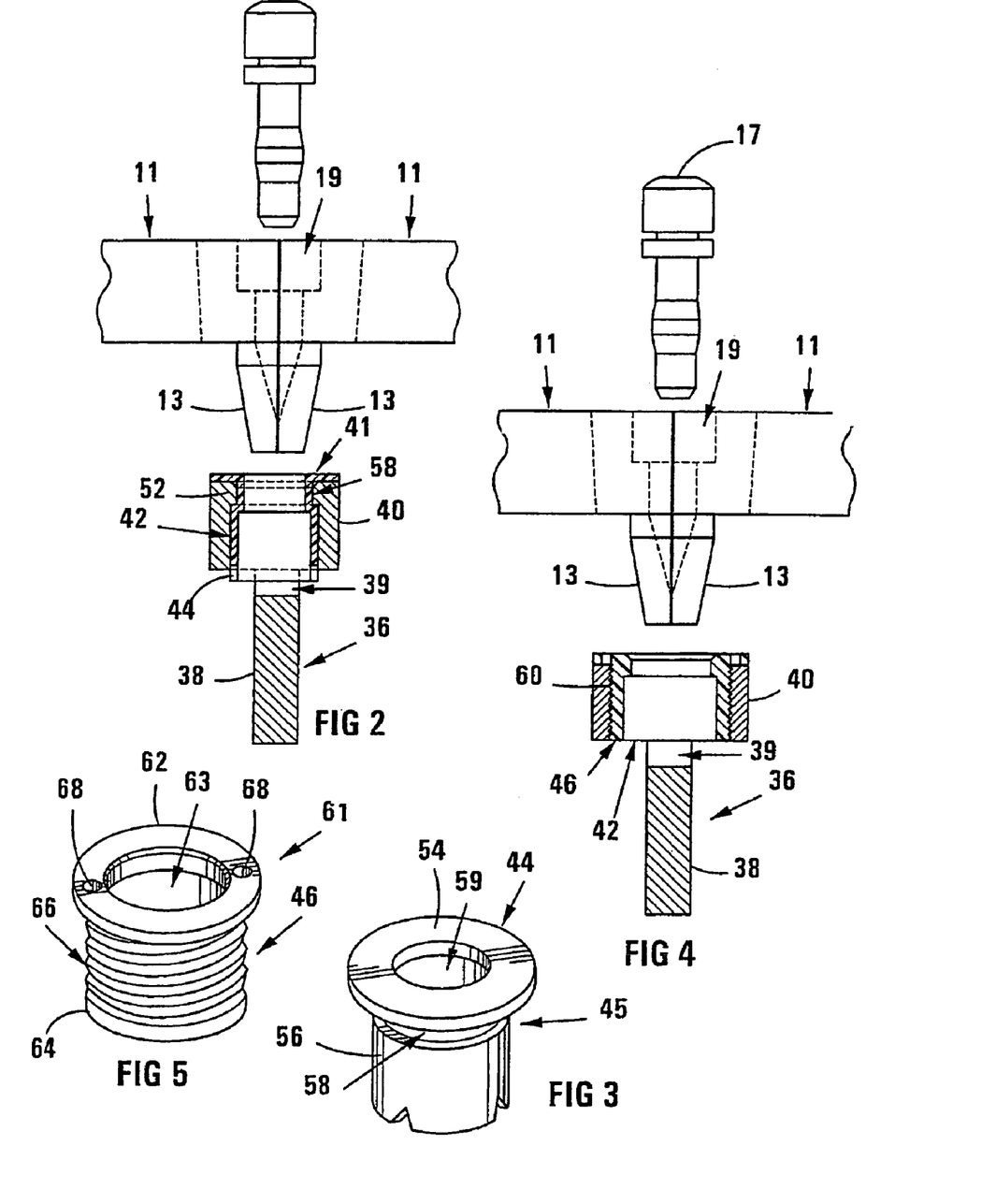
FIG. 2 is a cross-sectional fragmentary view of a screen support frame sub-assembly according to another aspect of the invention, also showing, in fragmentary view, a pair of conventional screening panels (not according to the invention) about to be secured to the screen support frame sub-assembly and in cross-section, one embodiment of a securing device according to another aspect of the invention.
FIG. 3 is a three-dimensional view of the securing device of FIG. 2.
FIG. 4 is a cross-sectional fragmentary view of a screen support frame sub-assembly according to the invention, also showing, in fragmentary view, a pair of conventional screening panels (not according to the invention) about to be secured to the screen support frame component, and in cross-section, another embodiment of a securing device according to another aspect of the invention.
FIG. 5 shows a three-dimensional view of the securing device of FIG. 4.

In the version of this embodiment of the invention shown in FIGS. 2 and 3 of the drawings, the connecting formation in the primary socket 42 is a ridge or lip 52 extending peripherally around the upper open end 41 of the tubular member 40. In this embodiment of the invention, the securing device 44 is of a durable synthetic polymeric material such as polyurethane having a Shore hardness of about 95 to about 99 Shore A. The device 44 includes an insert 45 which includes a peripheral flange 54 and a stepped, downwardly depending skirt 56 fast with the flange 54, the flange 54 and skirt 56 defining a secondary opening in the form of a secondary socket 59. An external, radially outwardly facing peripheral groove 58 is defined between the flange 54 and the skirt 56 such that, when the skirt fits with interference into the primary socket 42 defined by the tubular element 40, the peripheral groove 58 engages the lip 52 to retain the device 44 within the primary socket 42, thereby to connect the device 44 to the bar 38.

Instead, in another version, shown in FIGS. 4 and 5 of the drawings, the connecting formation in the primary socket 42 is a screw thread 60. The securing device 46 is then also of hard-wearing synthetic plastics material and includes an insert or interface 61 which includes a flange 62 extending peripherally around the open upper end of the insert, and a downwardly depending skirt 64 fast with the flange 62, the flange 62 and the skirt 64 defining a secondary opening in the form of a secondary socket 63. An external screw thread 66, which is complementary to the screw thread 60, is provided on the outer surface of the skirt 64. The device 46 can be screwed into the socket 42 by means of a key (not shown), which has prongs to fit into keyholes 68 provided in the flange 62. In these embodiments of the invention, as shown in FIGS. 2 and 4 of the drawings, the screening panels 11 are provided with protrusions 13 on their undersurfaces which, when adjacent panels are brought into register with one another will fit into the secondary sockets 59 and 63 formed in the devices 44, 46, and securing pins 17 are then knocked into complementary bores 19 which are formed when the panels are brought into register with one another, to secure the panels 11 to the elongate bar 38.

It is an advantage of the screen support frame sub-assemblies and the devices 44, 46 according to this aspect of the invention that the devices 44, 46 can easily be replaced when they become worn in use as a result of the stresses placed on the screening panels being transmitted via the protrusions 13 to the inserts 44, 46.

In another version of this aspect of the invention, shown in FIGS. 6 to 10 of the drawings, the devices 48, 49, 50 and 51 include locating protrusions or spigots 28, 29, 31 and 33, which extend axially from the devices. It is to be understood that the versions of the aspect of the invention shown in FIGS. 6 to 10 of the drawings are intended for use with screening panels 10 according to the invention.

Figure 6:
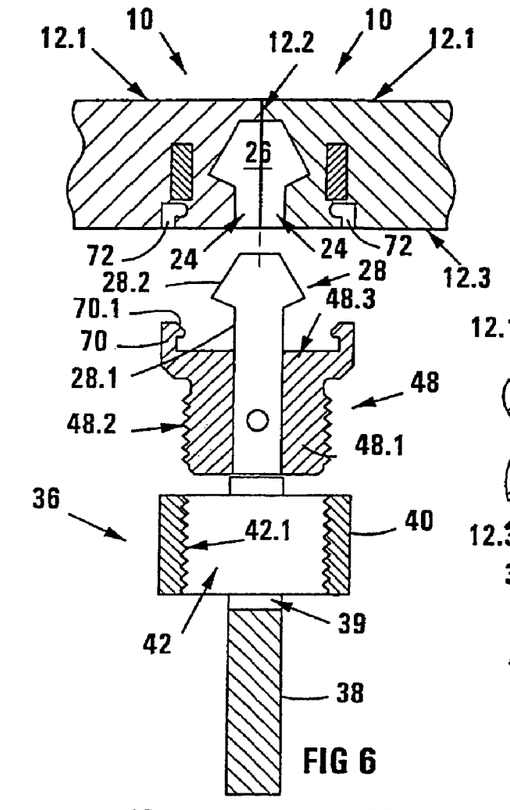
FIG. 6 shows a cross-sectional exploded view of a screen support frame sub-assembly and in fragmentary view a pair of screening panels according to the invention with locating and securing formations to locate and secure the screening panels to the screen support frame component sub-assembly, and in cross-section, another embodiment of a securing device according to another aspect of the invention.

In the embodiment shown in FIG. 6, the device 48 includes an insert which includes a monolithic cylindrical body portion 48.1 provided with a screw-thread 48.2 on its outer surface, which is complementary to a screw-thread 42.1 provided on the inner surface of the primary socket 42 formed by the tubular element 40. The insert 48 also has an annular ridge 70 which has an overhanging radially inwardly directed lip 70.1, which form separate securing formations standing proud of the upper surface 48.3 of the insert 48, and which are receivable with interference within complementary semi-circular recesses 72 provided in panels 10 according to the invention, which semi-circular recesses 72, when the panels are brought into register, form annular recesses. The protrusion or spigot 28 extends axially away from the body 48.1 of the insert 48 and includes a shank member 28.1 and a head 28.2, which fit with interference into the locating socket 26 formed when adjacent panels 10 according to the invention are brought into register to be secured to an elongate bar 38.

Figure 7:
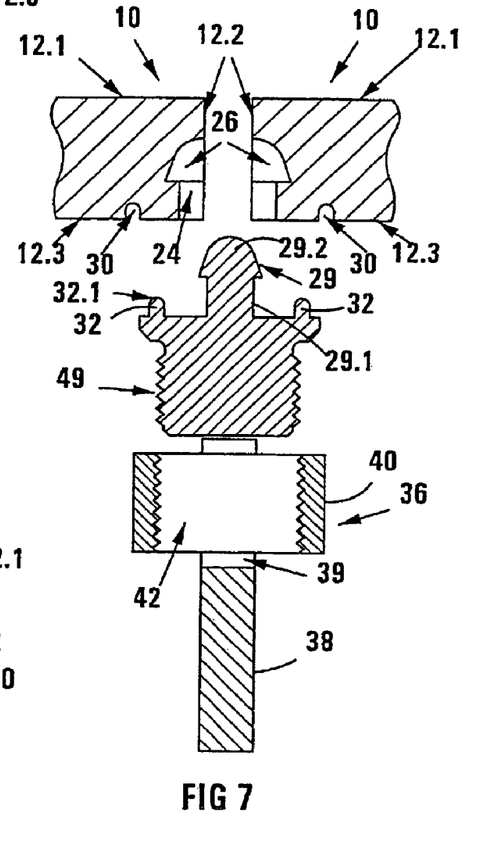
FIG. 7 shows a cross-sectional fragmentary exploded view, similar to FIG. 6, of another embodiment of the invention.
Figure 8:
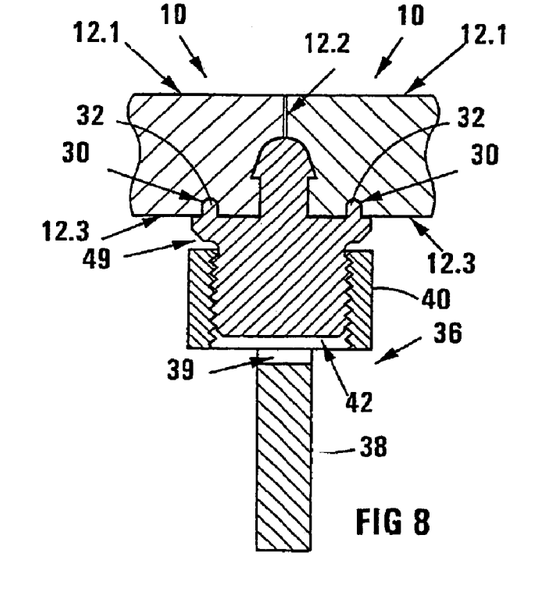
FIG. 8 shows a fragmentary cross-sectional view of the version of the embodiment of FIG. 7 once the locating and securing formations on the screening elements have engaged complementary formations on a securing device of the screen support frame sub-assembly.
Figure 9:
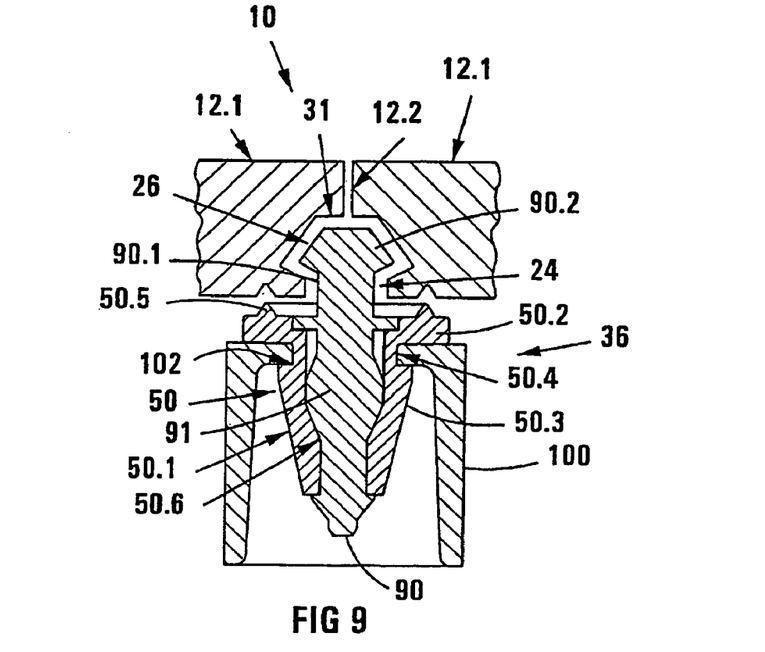
FIG. 9 shows a fragmentary cross-sectional view of screening panels, another embodiment of a screen support frame sub-assembly and another embodiment of a securing device according to the invention.

In the embodiment shown in FIG. 7 and 8, the device 49 is similar to the device 48 of FIG. 6 of the drawings, except that the annular ridge 32 has a rounded upper surface 32.1, which fits with interference into complementary semi-circular securing recess 30 in the panels 10 according to the invention. Furthermore, the protrusion or spigot 29 on the insert 49 includes a shank 29.1 similar to the shank 28.1 of the insert 48, but a more rounded head 29.2 at the end of the shank 28.1.

In the embodiment shown in FIG. 10, the tubular elements 40 are recessed into the cut outs 39 of the elongate bar 38. The device 51 is similar to the device 48 of FIG. 6 of the drawings, except that the annular ridge 82 has a sharper upper surface 82.1 which will fit with interference into complementary semi-circular recess in the panels 10 according to the invention. The device 51 also includes an insert which includes a monolithic cylindrical body portion 51.1 provided with an external screw thread 51.2 which is complementary to the screw thread 42.1 provided on the inner surface of the primary socket 42 formed by the tubular element 40. The locating protrusion 33 includes a shank member 33.1 and a head 33.2 similar to those of the devices 48 of FIG. 6. It is also to be noted that in the embodiment of FIG. 10, when the device 51 is screwed into place into the tubular member 40, the upper surface 51.3 of the device is flush with the upper surface 38.1 of the elongate bar 38.

In the embodiments of FIGS. 6, 7, 8 and 10, the devices shown are unitary. In contrast, the embodiment shown in FIG. 9, the securing device 50 includes an insert 50.1 which includes a peripheral flange 50.2 and a resiliently deformable skirt 50.3 fast with the flange 50.2, a peripheral radially outwardly facing groove 50.4 being defined in the body portion between the flange 50.2 and the skirt 50.3, and an annular ridge which stands proud axially of the peripheral flange 50.2. The insert 50.1 defines an axial bore 50.6 for receiving a separate pin 90, which pin 90 incorporates a shank 90.1 and a head 90.2. In this embodiment, an elongate screen support member can be in the form of an elongate channel iron section 100 having openings 102 formed therein or an elongate bar 38 having openings in the form of a primary socket 42 as shown in FIG. 2, at desired intervals as described before. When the securing device 50 is to be used on existing screen support frames that include the elongate bars 38 or channel irons 100, the resiliently deformable portion 50.3 can be urged into the openings 42 in the tubular members 40, or openings 102 in the channel iron, as the case may be. Thereafter, the pin 90 which is formed with a bulge 91 is urged into the axial bore, the bulge 91 expanding the skirt 50.3 and the peripherally radially outwardly facing groove 50.4 engaging with the edges of the opening 102, or the lip 52, as the case may be, to connect the securing device 50 to the channel section 100 or bar 38 as the case may be. The panels 10 according to the invention can then be located and secured on the channel sections 100 or bars 38 in the manner similar to that described with reference to FIGS. 6 to 8 above. The particular advantage of this embodiment of the securing device and screening panel of the invention is that they can be used on existing screen support frames which are made of channel iron sections 100, or bars 38 having tubular members 40 as shown in FIG. 2 affixed thereto.

Figure 11:
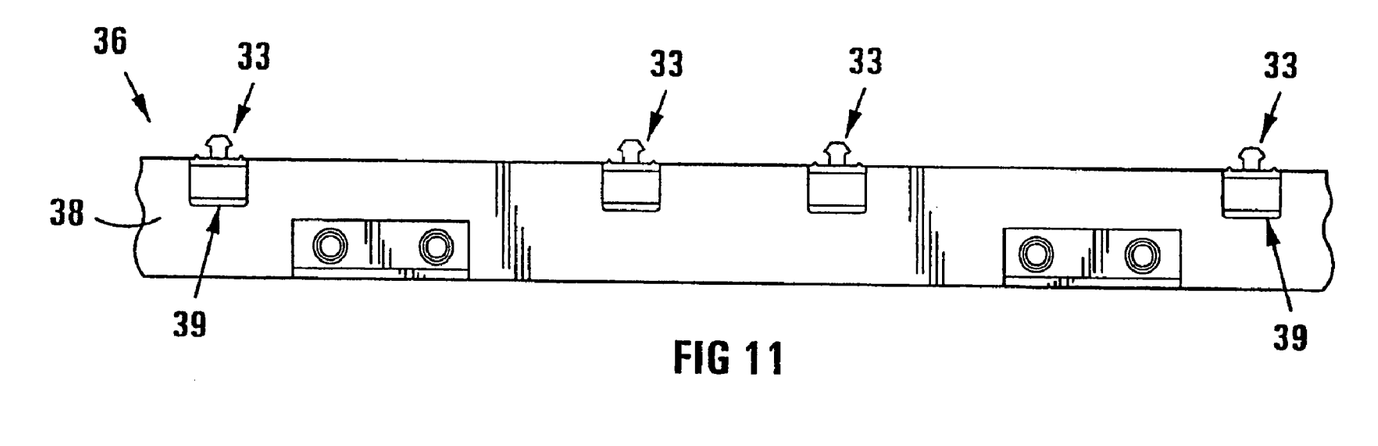
FIG. 11 shows a fragmentary side view of a screen support frame sub-assembly according to the invention.
Figure 12:
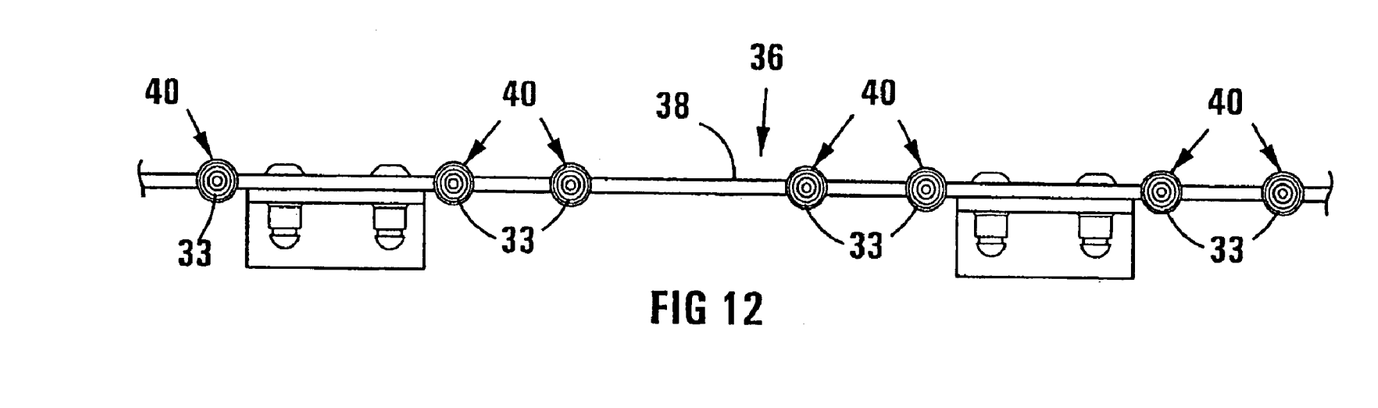
FIG. 12 shows a top plan view of the sub-assembly of FIG. 11.

A screen support frame sub-assembly 36 as shown in FIGS. 11 and 12 includes an elongate bar 38 having cut outs 39 therein, and a plurality of tubular elements 40 affixed thereto, the tubular elements 40 being spaced from each other by distances complementary to the spacing between locating recesses 24 and grooves 30 in the panels 10 according to the invention.

A screen support frame 80 as shown in FIG. 13 includes a plurality of elongate bars 38 as described, which are spaced from and parallel to each other and spaced apart from each other by spacer bars 78, thereby to form a grid-like structure on which screening panels 10, 11 can be fitted as described, to provide a screening arrangement.

It is an advantage of the embodiment of the invention as illustrated in FIGS. 6 to 10 that the devices 48, 49, 50 and 51 have, in combination, locating formations in the form of the protrusions or spigots 28, 29, 31 and 33 as well as separate securing formations in the form of the annular ridges 70, 82, 32, and 50.5 respectively, which engage complementary formations 30 and 72 on the screening panels 10 in accordance with the invention. The locating protrusions locate the panels in place on the elongate support bars 38, and the annular ridges secure the panels in place against transverse movement on the elongate support bar 38, or the channel sections 100 as the case may be, in use. In conventional screening panels known to the Applicant, in the absence of a combination of the protrusions 28, 29 and the annular ridges 70, 32 and complementary recesses 72, 30 in the panels 10, the panels 10 tend to become dislodged and move transversely across a screen in use. It is a further advantage that the screening area of a panel which is available is increased by virtue of the fact that only half of the periphery of a panel 10 rests on the elongate support bar 38. It is yet a further advantage that, the securing devices 48 and 50 also being of hardwearing synthetic plastics material, ensures easier mating and disconnection of the panels 10 from the protrusions 28 and annular ridges 32 in use when required to do so, either to replace the panels 10, the securing devices 48, 50, or both.

Figure 14:
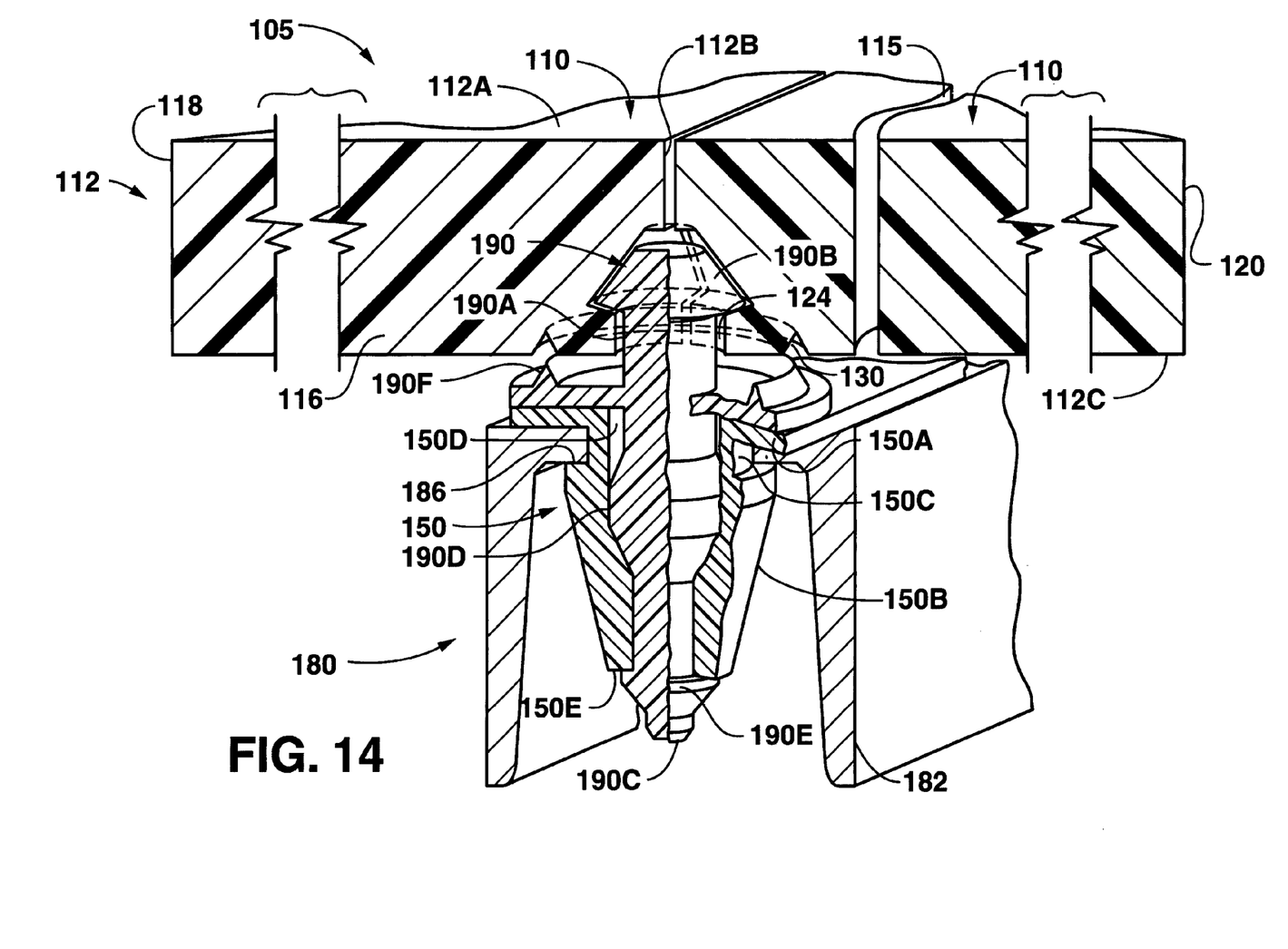
FIG. 14 shows a shows a fragmentary cross-sectional view of a conversion kit according to another aspect of the invention.
Figure 15:
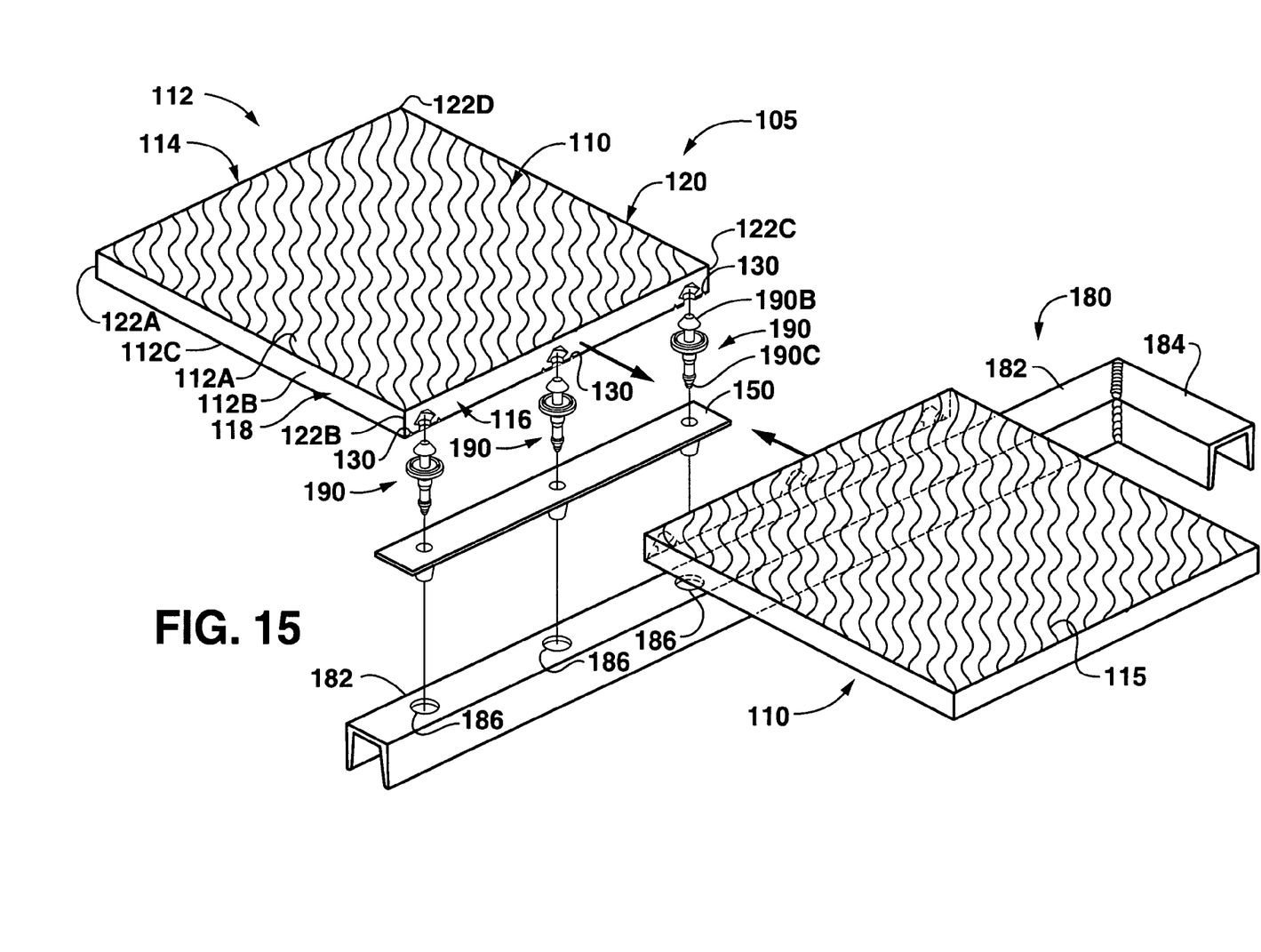
FIG. 15 is a perspective view showing steps in a method of joining components as in FIG. 14 according to another aspect of the invention.

Turning now to another embodiment of the invention shown in FIGS. 14 and 15, a conversion kit 105 broadly includes a plurality of screening panels 110, an insert or interface 150 and a pin 190. As will be described in greater detail below, these adaptive components of the conversion kit 105 permit the technician to replace obsolete or worn screening panels on existing support frames without having to modify or replace the support frames to accommodate various screening panels.

With more particular reference to FIGS. 14 and 15, at least two of the screening panels 110 in this example are mated together by the pin 190. The pin 190 is press-fit into the interface 150, which is press-fit into an elongated bar 182 of a screen support frame 180 to secure the screening panels 110 to the support frame 180. For clarity, only one elongated bar 182 is shown in FIGS. 14 and 15 connected to one spacer bar 182 of the support frame 180. Additionally, many components of the conversion kit 105 and their material make-up are similar to components of previously described aspects in other embodiments of the invention. Therefore, reference is hereby made to the foregoing embodiments for additional enabling details of certain components of the conversion kit 105 if not expressly discussed below.

As shown in FIGS. 14 and 15, the screening panel 110 includes a peripheral frame 112 that is formed by a union of laterally spaced side members 114, 116 and axially spaced end members 118, 120. As shown, the peripheral frame 112 has an upper peripheral surface 112A, an outer peripheral surface 112B, and a lower peripheral surface 112C, and the members 114, 116, 118, 120 meet to form a plurality of corners 122A, 122B, 122C and 122D.

In the example shown in FIGS. 14 and 15, a locating recess 124 is formed in the side members 116 of the screening panels 110, and more particularly, within portions of the outer and lower peripheral surfaces 112B, C. A securing recess 130 is formed about the locating recess 124. The securing recess 130 is a semi-circular groove in this example, which as discussed below, is shaped complementarily to a securing ridge 190F of the pin 190. The skilled artisan will instantly appreciate that the securing ridge 190F of the pin 190 can be a plurality of projections, or square in shape or assume a variety of other shapes and quantities. For instance, the securing ridge 190F could be a plurality of concentric rings. Likewise, the securing recess 130 can assume other shapes and quantities and is not limited to the exemplary groove shown in FIG. 14.

FIGS. 14 and 15 further show the interface 150 briefly introduced above. As shown most clearly in FIG. 14, the interface 150 includes a peripheral flange 150A and a deformable skirt 150B extending from the flange 150A. A groove 150C is formed in this example between the flange 150A and the skirt 150B to receive a cut-out or aperture 186 of the bar 182. Additionally, an axially aligned bore 150D is formed through the flange 150A and the skirt 150B for insertion of the pin 190. A securing shoulder 150E is defined on the skirt 150B for anchoring a detent 190E of the pin 190. Although the interface 150 is shown in FIG. 15 having a length approximately equal to the side member 116, as well as having three (3) bores 150D, the skilled artisan will instantly recognize that the interface 150 can be shorter or longer and have fewer or additional bores 150D than the illustrated example.

With more particular reference to the pin 190 shown most clearly in FIG. 14, a shank 190A of the pin 190 terminates at a crown or head 190B, which is inserted in the locating recess 124. As shown, the head 190B exhibits a frusto-conical shape, appearing in this example as an inverted bowl. More specifically, the frusto-conical head 190B tapers in a direction of the upper peripheral surfaces 112A of the panels 110 and flares radially in a direction of the securing recess 130. In other words, an outer diameter of the frusto-conical head 190B decreases from proximate the shank 124 in the direction of the upper peripheral surfaces 112A.

As further shown in FIG. 14, the recess 124 is also frusto-conically shaped complementary to the head 190B. So shaped, the locating recess 124 and the head 190B cooperate to stabilize the pin 190 in the panels 110. Those skilled in the art will appreciate that the locating recess 124 and the head 190B are not limited to the inverted bowl shape. For example, the locating recess 124 and the head 190B can be modified to a square or other shape. Moreover, at least one of the panels 110 can be modified to have a projection and the pin 190 can be modified to have a recess in at least part of the head 190B such that the projection from the panel 110 seats within the head 190B.

With continued reference to FIG. 14, the pin 190 also defines an opposing finger or extension 190C with a bulge 190D. As shown, the bulge 190D presses radially against the skirt 150B to secure the pin 190 in the skirt 150B, and thus, the skirt 150B is secured within the aperture 186 of the bar 182. Further, the detent 190E is formed on the extension 190C to anchor against the securing shoulder 150E as noted above. Also as introduced above, the securing ridge 190F of the pin 190 mates in the securing recesses 130 of the panels 110 to prevent displacement of the panels 110 from the elongated bars 182 and the spacer bars of the support frame 180 as the panels 110 are rapidly shaken to screen particulates.

The invention may be better understood with reference to use of the conversion kit 105 as shown in FIGS. 14 and 15. As shown, the support frame 180 is formed with a plurality of the apertures 186 in the elongated bars 182 for attaching screening panels. As certain panels wear out due to inherent abrasiveness of particulates such as mineral ore, only the worn panels need be replaced. If the worn panels are of the type with protrusions as described in U.S. Pat. No. 4,892,767, improved panels such as the panels 110 must be adapted to the existing support frame 180. Accordingly, the interface 150 is provided with the deformable skirt 150B, which is press-fit into the aperture 186 of the elongated bar 182. Specifically, as a force is applied to the interface 150 in a first direction into the aperture 186, the skirt 150B yields inwardly until the groove 150C axially slides into a mating arrangement with the aperture 186. The meeting of the groove 150C and the aperture 186 prevents the interface 150 from sliding off of the bar 182.

As most clearly shown in FIG. 14, the bore 150D of the skirt 150B defines an inner diameter, which is smaller than the aperture 186. The pin 190 is press-fit into the bore 150D in a manner similar to the skirt 150B being pressed into the aperture 186. Specifically, as a force is applied to the pin 190 into the bore 150D, the bulge 190D of the pin 190 presses radially against the skirt 150B causing the resilient material of the skirt 150B to yield outwardly. As the bulge 190D passes axially through the bore 150D the detent 190E projects past the shoulder 150E of the skirt 150B. Accordingly, the pin 190 becomes anchored within the interface 150. Specifically, the interlocking action of the shoulder 150E and the detent 190E prevents the pin 190 from being pulled out of the interface 150 in a second direction opposite the first direction described above. Additional pins 190 (and interfaces 150 as necessary) can be attached in the same manner as described above. Alternatively, or in addition to the interaction of the shoulder 150E and the detent 190E above, a connecting force can be applied to the pin 190 in a first direction and the pin 190 will press against the skirt 150B to prevent a movement of the pin 190 in a second direction opposing the first direction.

As further shown in FIGS. 14 and 15, the panels 110 are slid into a mating arrangement on the pins 190. Specifically, the heads 190B are received in the locating recesses 124 of the panels 110, and the securing ridges 190F project into the securing recesses 130 of the panels 110 to hold the panels 110 in place relative to each other and on the support frame 180.

To facilitate a particular order of assembly of the conversion kit 105, the component parts can be color-coded. For instance, the panels 110 can be red, the interface 150 can be yellow, and the pin 190 can be blue. Thus, printed instructions (not shown) can be provided with the conversion kit 105, which instruct the technician to assemble the conversion kit 105 in color-coded order.

While preferred embodiments of the invention have been shown and described, those skilled in the art will recognize that other changes and modifications may be made to the foregoing embodiments without departing from the scope and spirit of the invention. For example, specific materials and dimensions are set forth for current applications and industry regulations and specific shapes of various elements of the illustrated embodiments may be altered to suit particular applications. It is intended to claim all such changes and modifications as fall within the scope of the appended claims and their equivalents.

That which is claimed is:

1. A conversion kit for interconnecting a plurality of particulate screening panels, the conversion kit comprising:
   at least two screening panels together defining a locating recess therein and an annular securing recess that extends at least partly around the locating recess;
   an interface having a skirt depending therefrom and a bore therethrough; and
   a pin defining a head and an opposing extension, the head having a shape complementary to the location recess, wherein the pin further includes a peripheral flange and a securing ridge that stands proud axially of the peripheral flange, the securing ridge having a shape complementary to the securing recess, further wherein the opposing extension is configured for insertion in the bore of the skirt, the skirt being configured for insertion in an aperture of a support frame.

2. The conversion kit as in claim 1, wherein the screening panels each define a plurality of ribs thereon being configured to sift a particulate therebetween.

3. The conversion kit as in claim 1, wherein the screening panels are made of a resiliently deformable material.

4. The conversion kit as in claim 3, wherein the resiliently deformable material is a synthetic polymeric material.

5. The conversion kit as in claim 1, wherein the head is made of a resiliently deformable material.

6. The conversion kit as in claim 1, wherein the head is made of a synthetic polymeric material.

7. The conversion kit as in claim 1, wherein the opposing extension defines a bulge larger than at least one portion of the bore of the skirt, the skirt resiliently yieldable to a passage of the bulge upon application of a connecting force to the opposing extension.

8. The conversion kit as in claim 7, wherein the bulge is configured to press against the skirt to prevent a movement of the opposing extension in a direction opposing the connecting force.

9. The conversion kit as in claim 1, wherein the opposing extension defines a detent thereon and the skirt has a shoulder defined about the bore the detent being configured to bypass the shoulder in a first direction upon application of a connecting force to the opposing extension, the detent being further configured to anchor against the shoulder to prevent a movement of the opposing extension in a second direction opposite the first direction.

* * * * *

UNITED STATES PATENT AND TRADEMARK OFFICE
CERTIFICATE OF CORRECTION

| | |
|---|---|
| PATENT NO. | : 7,621,406 B2 |
| APPLICATION NO. | : 11/292599 |
| DATED | : November 24, 2009 |
| INVENTOR(S) | : Freissle et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 522 days.

Signed and Sealed this

Twenty-sixth Day of October, 2010

David J. Kappos
*Director of the United States Patent and Trademark Office*